2,913,721

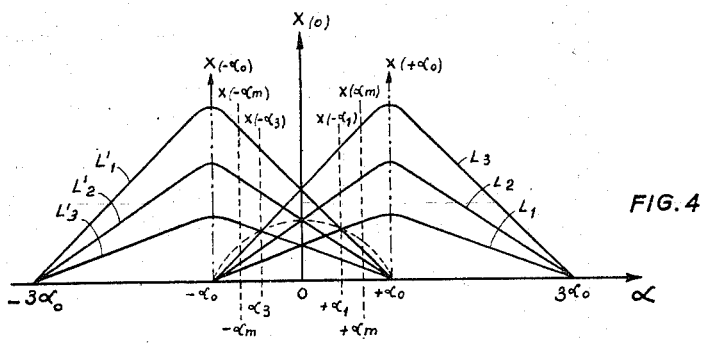
FIG. 4
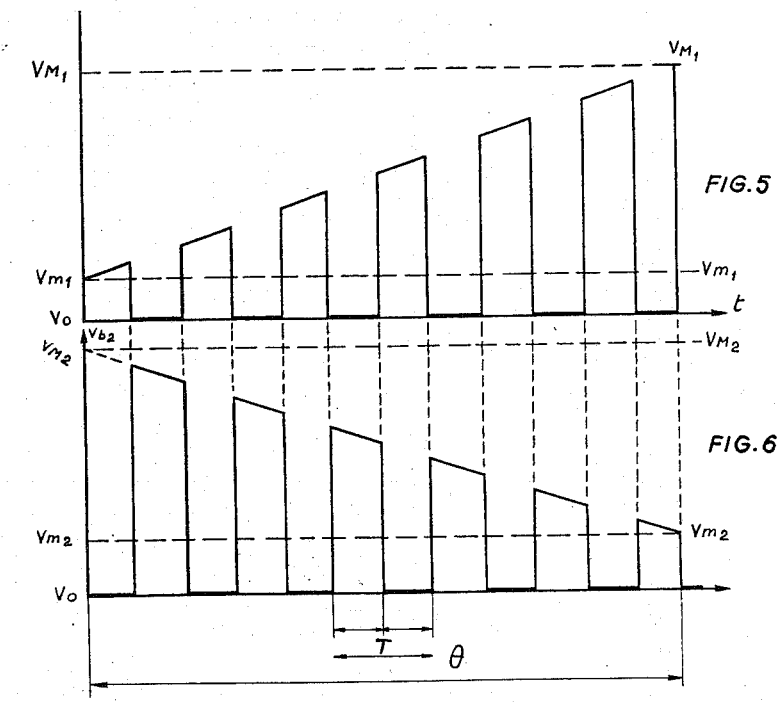
FIG. 5
FIG. 6
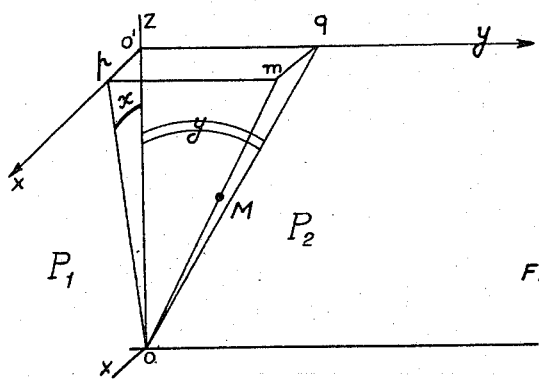
FIG. 7

RADIO DIRECTION FINDING SYSTEM

Antoine Jean Ortusi and André Robert, Paris, France, assignors to Compagnie Generale de Telegraphie Sans Fil, a corporation of France Application June 18, 1954, Serial No. 437,606

Claims priority, application France June 20, 1953

6 Claims. (Cl. 343—121)

A new direction finding system was described in the patent application Serial Number 322,102, filed November 22, 1952, which matured into the U.S. Patent 2,789,285.

It is an object of the present invention to provide a device, derived from the aforementioned system, by means of which it is possible to represent different objects in space on the screen of a cathode ray tube in a manner similar to the representation well-known in astronomy, namely a map of the heavens. This latter display is obtained from a television type scanning.

It is another object of the invention to provide means whereby it is possible to derive from the aforementioned device voltages that are proportional to the respective angles between the directions of these objects and a fixed or moving axis intersecting a fixed centre.

The invention will be better understood from the ensuing description with reference to the accompanying drawings in which, Figs. 1 and 2 are plan and elevational views respectively of one embodiment of a receiver antenna used in the device embodying the invention;

Figs. 4, 5 and 6 are curves explaining the operation of the device shown in Fig. 3;

Figure 8:
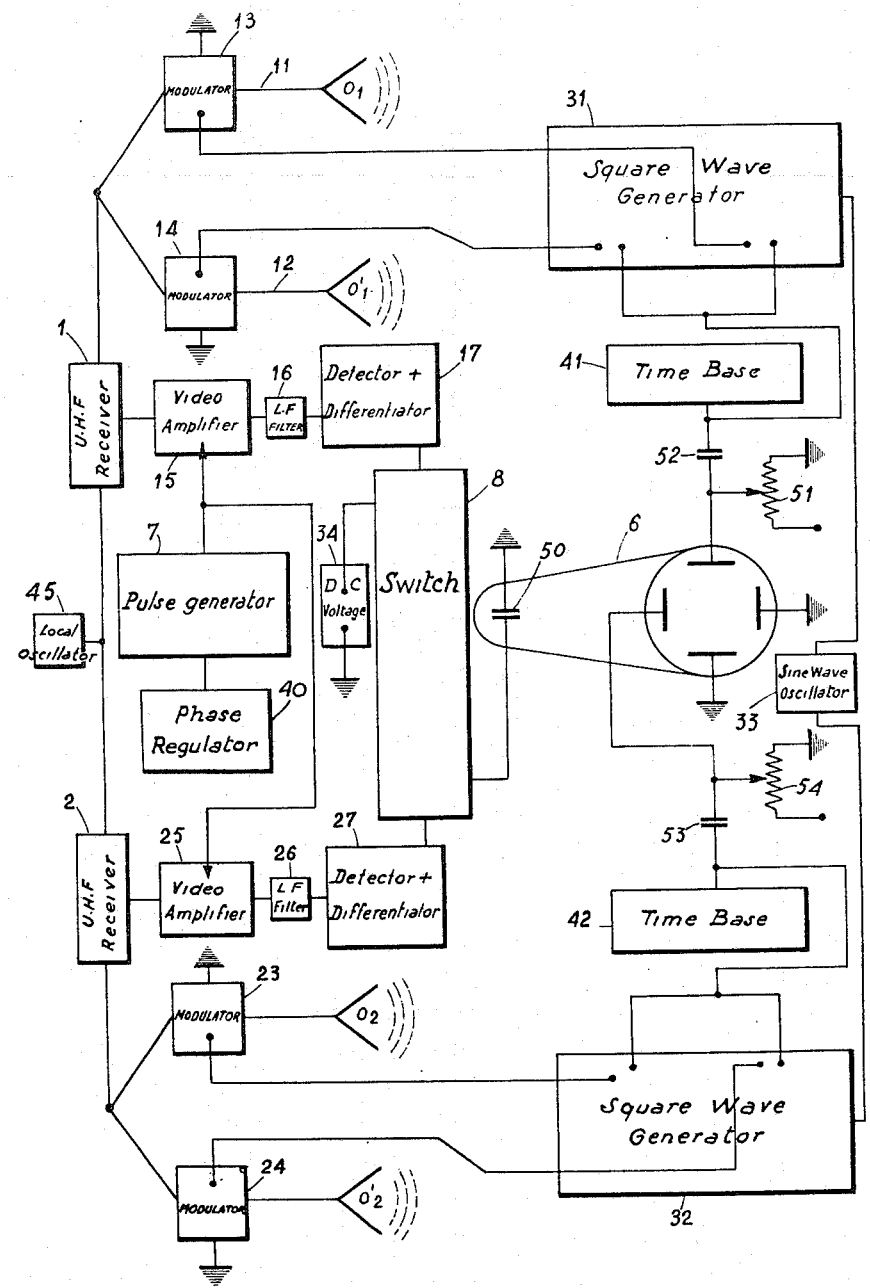
Figure 10A:
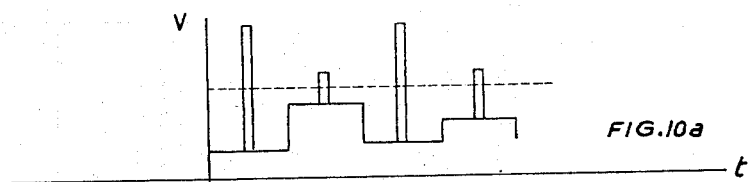
Figure 10B:
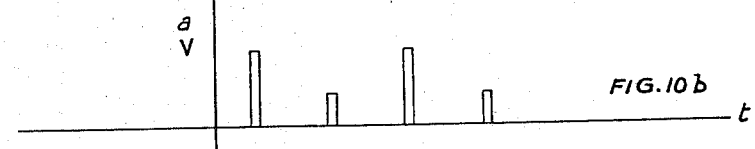
Figure 12:
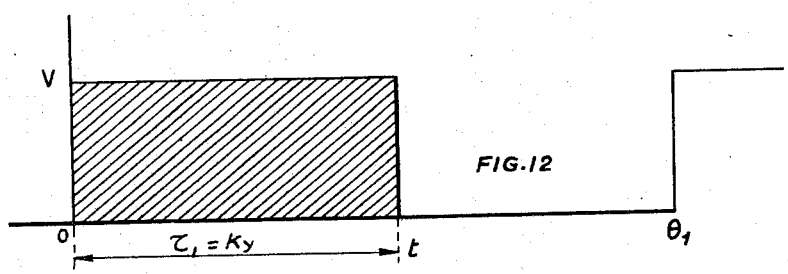
Figure 11:
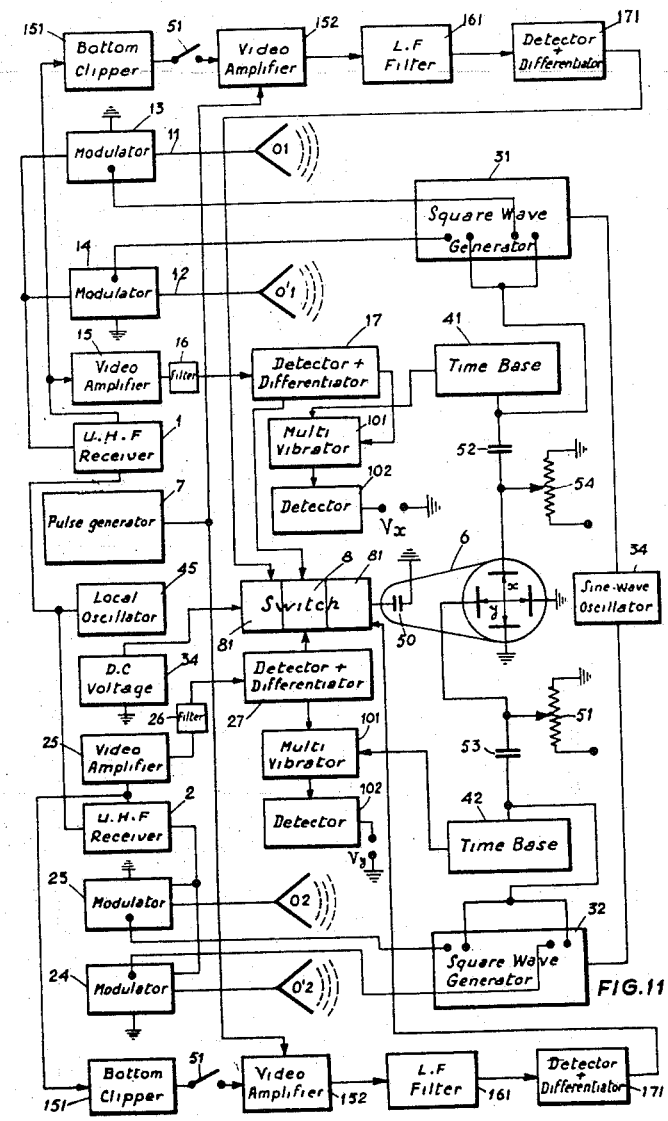

Fig. 7 diagrammatically shows how a portion of the space may be represented on a screen, or otherwise, according to the same method as used to provide a map of the heavens;

Fig. 8 is a diagrammatic view of an assembly embodying a system provided by the invention which enables the representation of a portion of the space according to the method schematized in Fig. 7;

Figs. 9a to 9f show a group of curves explaining the operation of the device shown in Fig. 8;

Figs. 10a and 10b show the signals received in the case of simultaneous reception of pulses and continuous waves;

Fig. 11 shows another embodiment of the assembly of Fig. 8 wherein some additional circuits have been incorporated;

Fig. 12 shows the voltages obtained when the system of Fig. 11 is used as a telecontrolling system.

To make a better understanding of the invention possible, the operation of the direction finding system, described in the aforementioned co-pending patent application (Figs. 1 to 3), as applied to position determination in space, will first be recalled.

This system comprises two receivers 1 and 2. The receiver 1 is connected to two antennas $O_1$ and $O_1'$ by two guides 11 and 12 respectively. The receiver 2 is connected to two antennas $O_2$ and $O_2'$ by two guides 21, 22 respectively. In the guides 11, 12, 21 and 22 are respectively interposed four modulators 13, 14, 23 and 24 whose function is to change the propagating characteristics of the guides 11, 12, 21 and 22 respectively. These devices are controlled by two signal generating devices 31, 32, which are in turn controlled by two time bases 4 and 4'. The two outputs of the two receivers are connected to indicator 5 synchronized with the time bases 4 and 4'.

Figure 1:
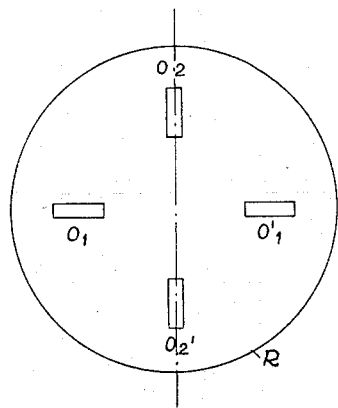
Figure 2:
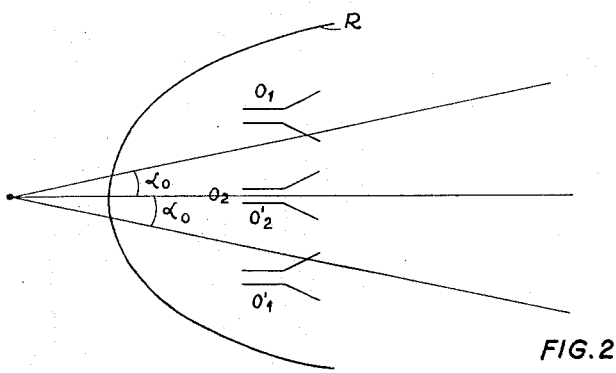

The antennas $O_1$, $O_1'$, $O_2$, $O_2'$ are for example four radiating slots or four horns placed at the four corners of a square. The four antennas are in the focal plane of a paraboloid reflector R (Figs. 1 and 2). Their directivity patterns have their maxima in four fixed directions which make an angle $\alpha_0$ with the geometric axis of the paraboloid.

Disregarding first the devices 13, 14, 23 and 24, since the guides 11, 12, 21 and 22 have the same transmission factor, the two antennas $O_1$ and $O_1'$ would give at the input of the receiver 1, signals of the same intensity for every transmitter situated in their median plane.

The same is true for the antennas $O_2$ and $O_2'$. Hence, every transmitter situated on the axis of the paraboloid, which is the line of intersection of these two median planes, would provide at the input of the receivers 1 and 2 signals of the same intensity.

The modulators 13 and 14 have firstly for effect, the one to increase periodically the transmission factor of the guide 11 and, the other, to decrease with the same periodicity the transmission factor of the guide 12, the transmission factor of the guide 11 increasing while that of the guide 12 decreases and the value at the beginning of a period of one being equal to the value at the end of a period of the other (Figs. 5 and 6). Hence a transmitter situated in the median plane of the antennas $O_1$ and $O_1'$ would produce at the input A of the receiver 1 a signal whose intensity varies inversely with that of the signal received at the input B of the receiver 1.

These devices 13 and 14 therefore have for effect to cause the secant plane of the two lobes, in which a transmitter should be located for providing two equal signals at the inputs A and B respectively, to pivot or oscillate about an axis which is the straight line $O_2-O_2'$ (Fig. 1).

Fig. 4 shows, as a function of the angle of directivity $\alpha$, i.e. the angle that the plane containing the transmitter and the slots $O_2$ and $O_2'$ makes with the geometric axis of the paraboloid, the intensity $x$ of the signals, assumed to have a constant amplitude at the transmission, received at the inputs A and B of the receiver 1, respectively.

For the antenna $O_1$, the signal is maximum when the transmitter is in the plane making the angle $\alpha_0$ with the median plane. It is substantially zero for the plane making the angle $-\alpha_0$ and the plane making the angle $3\alpha_0$.

For the antenna $O_1'$ there is a maximum signal for the angle $-\alpha_0$, and a zero signal for angles $\alpha_0$ and $-3\alpha_0$.

It has been shown in the aforementioned patent application that if, by means of voltages represented as a function of time in Figs. 5 and 6 respectively and applied respectively to the modulators 13 and 14, the transmission factors of the guides 11 and 12 are varied, the plane in which a transmitter must be situated for the antennas $O_1$ and $O_1'$ to receive equal signals oscillates with a uniform recurrence about the axis $O_2$, $O_2'$ (Fig. 1). Everything happens as though space was being swept with a sweeping plane, i.e. in so far as Fig. 4 is concerned as though the axis $Ox$ were alternately moving in the plane of this figure. It should be observed that the direction of this axis is known at each moment.

The receiver 1 detects the difference between the currents received by the antennas $O_1$ and $O_1'$ respectively. These currents are equal when the sweep plane passes through the transmitter. At this instant $Ox(\alpha)$ coincides with the direction $\alpha$ of the transmitter.

That which applies to the receiver 1 also applies equally to the receiver 2. Hence, the axis on which the transmitter is located is determined by the intersection of two planes. The latter are determined by the instants $\tau_1$ and $\tau_2$ at which each of the sweep planes passes through the transmitter.

According to the invention, the system described in the aforementioned patent application which has just been briefly recalled, is used in the representation of objects in space according to a method similar to that used in drawing a map of the heavens. This method, in contradistinction to the panoramic method of representation of objects in space, according to which the point of observation of the space is the center of the obtained display, provides the same representation of objects in space as that obtained when a portion of the sky, observed from the earth, is displayed on a map or screen: in this latter case, the point of observation does in fact not appear on the screen or map.

The nature of this method of representation will now be briefly recalled.

Assume O to be a point in space taken as the centre of a three dimensional system of co-ordinates OXYZ, and M a point in space. The straight line OM is drawn and its trace $m$ is taken on the plane $xO'y$ parallel to the plane XOY. The projections of $m$ on the axis $Ox$ and $Oy$ are $p$ and $q$ respectively. In such a system the direction OM is represented by the angular co-ordinates $$x = pOO'$$
$$y = qOO'$$

Fig. 8 shows the system embodying the invention whereby it is possible to represent space on the screen of an oscilloscope according to the method mentioned above.

On this Fig. 8 like reference numerals denote the like elements shown in the previous figures.

The ultra high-frequency receivers 1 and 2 are connected to a local oscillator 45. The outputs of the receivers 1 and 2 are connected respectively to the inputs of two video amplifiers 15 and 25, whose respective outputs are connected to the respective inputs of two low-frequency filters 16 and 26. The outputs of these filters are connected respectively to the inputs of two systems 17 and 27 each one of which comprises a detector circuit followed by a double differentiating circuit. These two circuits are connected to a switch 8 which, by controlling a D.C. source 34, is adapted to block or unblock the Wehnelt electrode 50 of a cathode-ray tube 6 in a conventional manner.

Figure 3:
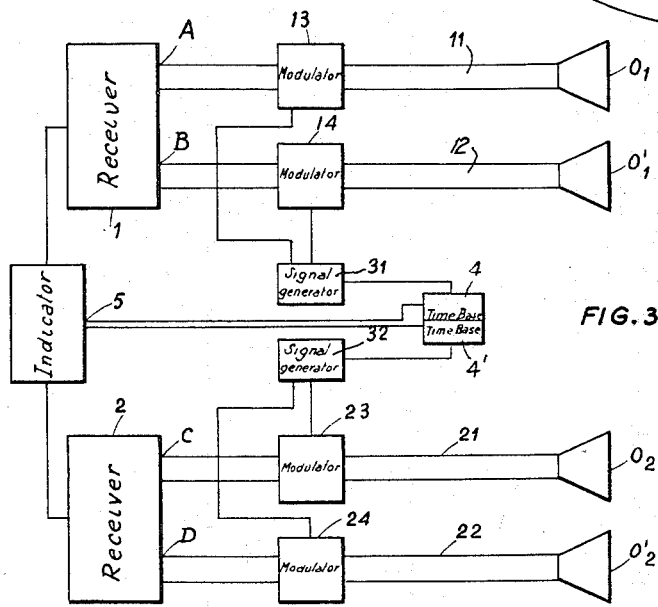
Fig. 3 shows a four channel directional system derived by duplication from the system described in the above mentioned patent.

The horizontal and vertical deflection plates of this tube, biased in a conventional manner by means of potentiometers 51 and 54 connected, respectively by two capacitors 52 and 53, to two time-base circuits 41 and 42 which are similar to the circuits 4 and 4' of Fig. 3. These two time base circuits are also connected to the square-signal generators 31 and 32 which are for instance fed from a common sine wave source 33 and act respectively on the modulators 13, 14 and 23, 24. These two time-base circuits and these two square wave signal generators are so adjusted as to give voltages similar to those of Figs. 5 and 6. Their switching periods T are identical but, the period $\theta_1$ of recurrence of the circuit 41 is about ten times higher than the period $\theta_2$ of the circuit 42 (see $\theta$ on Fig. 6).

A pulse generator 7, whose period of recurrence is fixed but whose phase is adjustable by means of a phase regulator 40, is connected to the two amplifiers 15 and 25 and serves to block them during the interval of time between two consecutive pulses it generates.

The device embodying the invention operates in the following manner.

It will be firstly assumed that it is desired to display the objects in space in the above outlined manner and that, furthermore, the object whose position is to be determined radiates continuous waves. Then, the pulse generator 7 is not connected to the amplifiers 15 and 25.

The square wave generators 31 and 32, respectively controlled by the time bases 41 and 42, generate voltages whose variation as a function of time is of the same type as that shown in Figs. 5 and 6. Their switching periods T are identical but the period $\theta_1$ of recurrence of the circuit 31 is about ten times higher than the period $\theta_2$ of the circuit 32 (see $\theta$ on Fig. 6). These devices are known per se and are described in the aforementioned patent application. A signal shown in Fig. 9a results at the output of the receiver 1. It is a rectangular waveform current. The current $I_M$, for example, corresponds to the field fed to the receiver from antenna $O_1$. It is, still by way of example, at first greater in amplitude than signal $I_m$ which corresponds to the field fed from the other antenna $O_1'$. The amplitudes of the fields received by the antennas $O_1$ and $O_1'$ respectively, as described in the aforementioned patent application and recalled above, are then varied and as the sweep plane approaches the direction of the transmitter, the difference between the amplitudes $I_M$ and $I_m$ decreases.

This signal passes through the video amplifier 15. The low frequency filter 16 eliminates the continuous current component and the harmonics of the high order and transforms the signal into an alternating current shown in Fig. 9b having period T and amplitude proportional to $I_M - I_m$. The current in the output of the detector at 17 has the form shown in Fig. 9c.

The differentiator associated with the detector at 17 operates on this signal a first differentiation which results in the signal of Fig. 9d, then a second differentiation which results in the pulse shown in Fig. 9e.

This pulse indicates the moment when the sweep plane passes through the transmitter. This pulse is sent through the switch 8 to the Wehnelt of the tube 6 which it contributes for its part to unblock.

The circuits associated with the antennas $O_2$ and $O_2'$ have an operation identical of that of the circuits associated with the antennas $O_1$ and $O_1'$. Thus in Fig. 9f there are two pulses sent to the switch 8. The latter is so constructed as to unblock the Wehnelt only if these two pulses are produced simultaneously. For this to occur the differentiating circuits are so adjusted that the pulse of duration $t_1$ coming from the channel $O_1$, $O_1'$ is of a width at least equal to $\theta_2$, which is the period of recurrence of the sweep of the antennas $O_2$ and $O_2'$. In this case (Fig. 9f), there will of course be a moment when these two pulses act simultaneously on the Wehnelt. Under these conditions a transmitter is represented on the screen of the oscilloscope by its cartesian co-ordinates $x$ and $y$ in Fig. 7.

It is obvious that such a system gives no indication of the range of the object. Further, if several transmitters are simultaneously situated in the field of the antennas, they produce simultaneous currents between which the apparatus, as described, is unable to discriminate. This disadvantage may be overcome if the transmitters transmit pulse-modulated waves. This is for example the case as concerns targets which reflect the signals transmitted by a radar transmitter, the said transmitter being located in the immediate vicinity of the device embodying the invention. Then, the pulse generator 7 is connected to the amplifiers 15 and 25. The signals reflected by the targets reach the antennas after a lapse of time which is proportional to their distance from the transmitter. The pulse generator 7 produces pulses whose phase difference with respect to the pulses transmitted by the radar transmitter is adjustable, for instance by means of a phase regulator 40. These pulses unblock the two amplifiers 15 and 25. The latter remain blocked for the rest of the time. If the frequency of the pulses of the generator 7 corresponds to a distance of for example 15 to 20 kilometres, the described device will only be sensitive to the signals transmitted by objects within a zone whose distance from the antennas is from 15 to 20 kilometers.

It will now be supposed that it is desired to determine the position of two objects one of which transmits in a continuous manner and the other in pulses. This is, for example, the case of a continuous wave emitted by a transmitter located on a mobile body and of a pulse modulated wave coming from an auxiliary radar and reflected by a mobile target. The receivers in this case furnish signals such as those shown in Fig. 10a, i.e. pulses superimposed on signals similar to those shown in Fig. 9a.

Each receiver 1 or 2 is in this case followed by two amplifying chains. In addition to the chain shown in Fig. 8 and comprising video amplifier 15, or 25, low frequency filter 16, or 26, and detector differentiator 17, or 27, and controlling switch 8, there is provided another chain. This chain comprises a bottom clipper 151 followed by a video amplifier 152, a low-frequency filter 161, a differentiating detecting unit 171 and a switch 81, as shown in Fig. 11. The switches 81 and 8 control the same Wehnelt electrode 50. Of course, switch 8 and both switches 81, respectively corresponding to receivers 1 and 2, may be combined into a single unit.

Figure 9:
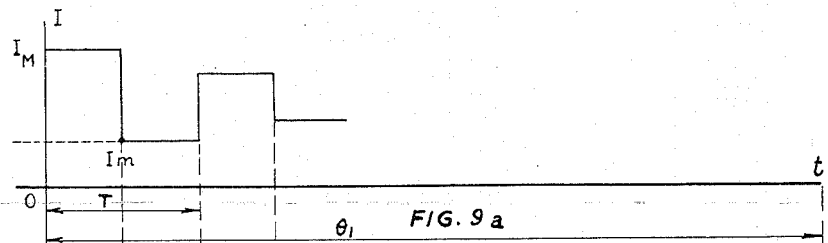
Figure 9:
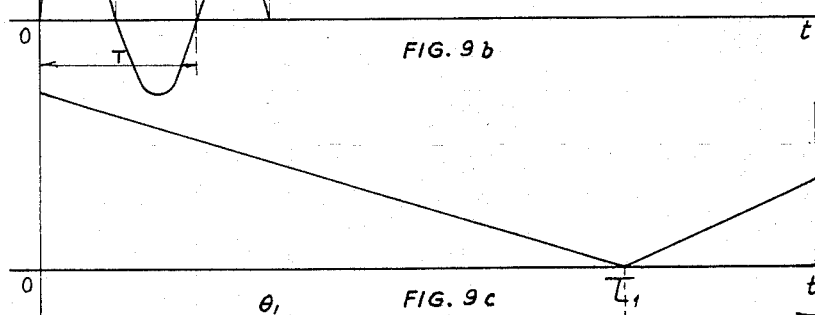
Figure 9:
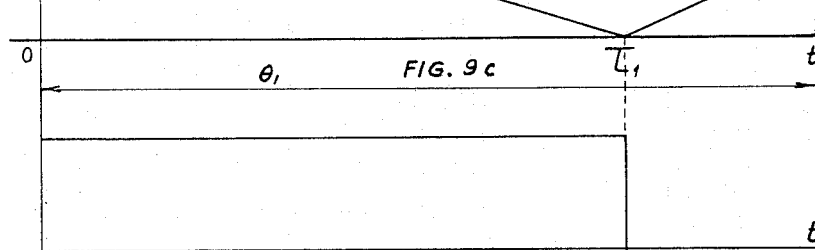
Figure 9:
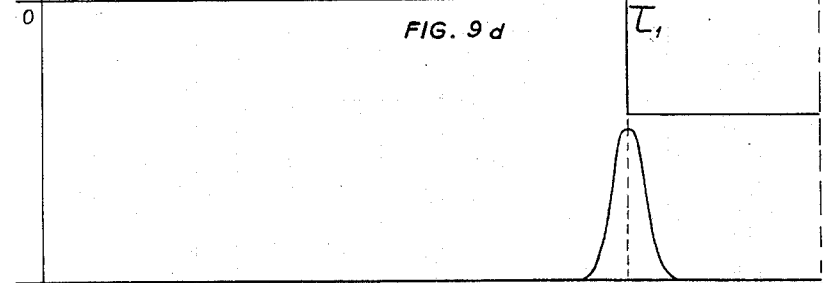
Figure 9:
Figure 9:
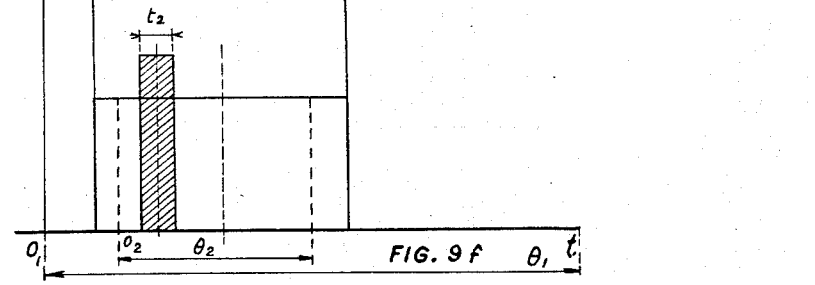

Botton clipper 151 produces pulses at its output (Fig. 10b). These pulses are also transformed in video amplifier 152 into an alternating current such as that shown in Fig. 9b, then into pulses such as that shown in Fig. 9e. On the other chain, filter 16 eliminates the harmonic components of a high order of the pulses and a current such as that shown in Fig. 9b is received at its output. The sequence of operations is then the same as that of the case of Fig. 9.

The switch 8 makes it possible to represent the echoes from the first chain of receivers 1 and 2, these chains being shown in Figs. 8 and 11 and the switch 81 those from the second chain of receivers 1 and 2, these chains being shown in Fig. 11. In order to distinguish them on the oscilloscope, there may for example be introduced in one of the chains an intermittent switch 51 which causes a blinking echo to appear on the oscilloscope. There may also be provided, on the object carrying the continuous transmitter, a device whereby it may be modulated in frequency in a recurrent manner. The frequency of this modulation might be of the order of 10 c.p.s. and the derivative of the frequency greater than the passband of the receivers 1 and 2. The echo produced on the oscilloscope under these conditions would also be an intermittent echo.

The system according to the invention not only provides a display of the objects in space in the above described manner, but may also be used as a telecontrolling system. It can readily be made to provide voltages proportional to the co-ordinates on the display screen or of the object whose position is to be determined, by means of a slight modification of the arrangement shown in Fig. 8. This modification has been incorporated into Fig. 11.

A bistable multivibrator 101 comprises two inputs, one of which is connected to the output of the differentiating device 17 and other to the time-base device 41. Its output is connected to a rectifier 102. The required voltages are received at $V_x$, or $V_y$ between the output of the latter and earth.

This device operates in the following manner:

This multivibrator furnishes in a first stable state, or state 1, a fixed voltage V and its second stable state, or state O, a zero voltage.

This multivibrator assumes the state 1 on the arrival of a pulse synchronized with the start of the scanning of space by the system of the invention as shown above, which corresponds to zero time in Fig. 9c and which is furnished by the time base 41. Then the pulse generated by detector differentiator 17 puts the multivibrator into the state O at the instant $\tau_1$ of the Fig. 9c. The echo pulse attains the multivibrator after a lapse of time $\tau_1$ proportional to the angle between the plane of the start of the sweep and the plane intersecting the object i.e. to the co-ordinate y.

The curve of the voltage received at the terminals of the multivibrator is shown in Fig. 12. This voltage is equal to V between the origin time and the time $\tau_1=ky$, k being a constant, then it is zero from time $t$ to time $\theta_1$, then the cycle recommences. The mean voltage, which is proportional to $ky$, is received at the terminals of the detector 102.

An analogous process gives the coordinate $x$ and the two angular coordinates $x$ and $y$ of the body are then well known.

The initial scanning pulse corresponds to the moment when the scanning plane is on one of its extreme positions. By a simple modification of the signals of Figs. 5 and 6 (as has been explained in the forementioned patent application) it is possible, at will, to use, as the start of the sweep, the median plane of the slots $O_1$ and $O_1'$.

The device embodying the invention can also furnish a signal whose energy is proportional to the angular distance between an object (like a friend body) transmitting a continuous wave and a target (like a foe body) reflecting pulse-modulated waves emitted by an auxiliary radar. It suffices to connect the respective two inputs of the multivibrators 101 respectively with the devices 17 and 171 shown in Fig. 11. The first pulse, whether it comes from the device 17 or 171, puts the multivibrator into the state 1 and the second pulse into the state O. There is then received at the terminals on the rectifier a voltage proportional to the angular distance between the transmitter transmitting in a continuous manner and the object reflecting pulses.

The voltages thus obtained are independent of the intensity of the fields radiated by the various objects. It suffices that the pulses formed by the various devices are greater than a given threshold for tripping the multivibrator 101. The voltages furnished by the latter are then strictly independent of both the continuous transmitter and the distance of the various objects and the ageing of the various elements of the device embodying the invention.

The device embodying the invention is very accurate. With a device conforming to the diagram in Fig. 11 and operating over a distance of 7.5 kilometers at a period of $T=10^{-4}$ seconds, a period of $\theta=10^{-3}$ seconds, $\theta_1=10^{-2}$ seconds, the pulse generator 7 providing pulses of $0.5\mu s$, with a mean frequency of recurrence of 10 per second, it is possible to pick out 100 objects in space.

The present device may be associated with, for example, an auxiliary scanning radar giving a representation known under the name of type A (graduation in distances) and there is thus obtained a double representation:

(a) Directions in the form of a map of the heavens;
(b) Distances.

Voltages may also be obtained that are strictly proportional to the angular distance between an object including a continuous transmitter and any one of the reflecting objects represented by the oscilloscope of the radar as well as by the oscilloscope of the map of the heavens.

What we claim is:

1. Radio direction finding system comprising in combination: a first and a second pair of directive receiving elements, said elements of said first pair and said elements of said second pair being respectively located at the diagonally opposite corners of a square; a first and a second receiver, said receivers having each an input and an output; first means for alternately connecting said receiving elements of said first pair to said input of said first receiver, said means comprising; a first square wave generator, a first time base circuit generating saw tooth voltage signals, having a period equal to a plurality of periods of said first square wave generator, for controlling said generator, respective modulators between said two first receiving means and said first receiver input; said first square wave generator being connected to said modulators for recurrently increasing the level of the signal fed by one of said receiving elements of said first pair to said first receiver and decreasing in synchronism the level of the signal fed by the other receiving element, the respective maximum and minimum levels being equal; second means for alternately connecting said receiving elements of said second pair to said input of said second receiver, said second means comprising: a second square wave generator having the same period as said first square wave generator, a second time base generating saw tooth voltage signals, having a period equal to a fraction of the period of said first time base, for controlling said second generator, respective modulators between said two second receiving means and said second receiver input, said second generator being connected to said modulators for recurrently increasing the level of the signal fed by one of the elements of said second pair to said second receiver and decreasing in synchronism the level of the signal fed by the other, the respective maximum and minimum levels being equal; a cathode ray oscillograph, having a Wehnelt electrode and a first and a second pair of deflection means, said first and said second pair of deflection means being respectively connected to said first and second time base device; a direct current voltage source; a switch for connecting said Wehnelt electrode to said direct current voltage source; and means for controlling said switch, said means comprising: a first chain and a second chain, respectively comprising a video amplifier, a low-frequency band pass filter, a detector device, and a double differentiating device, said chains being respectively coupled between said receivers respective outputs and said switch, whereby a display in the form of map of the heavens is obtained for objects emitting continuous waves.

2. Radio direction finding system, according to claim 1, further comprising; means for blocking and unblocking said video amplifier at timed intervals, said means comprising a generator of pulses having a fixed recurrence period, and means for controlling the phase of said pulses, whereby a display in the form of map of the heavens is obtained for objects emitting pulse modulated waves.

3. A system according to claim 2 further comprising: further switch means for controlling said Wehnelt electrode and respectively inserted between said receivers respective outputs and said further switch means; two chains each comprising: a bottom clipper, a detector, a second double differentiator, said chains controlling said switch, whereby the position of two objects, one of which emits a continuous wave and the other pulse-modulated waves, is obtained on a display of the form of map of the heavens.

4. A system according to claim 1 further comprising, a first and a second bistable multivibrator having respectively a first and a second input and one output, said first inputs of said multivibrators being respectively connected to said double differentiators and a first and a second detector, the respective second inputs of said first multivibrator and of said second multivibrator being respectively connected to the time-base devices; and a first and a second detecting device having respectively one input, said outputs of said multivibrators being respectively connected to said inputs of said detecting devices; whereby voltages proportional to the angular coordinates of an object, whose position is to be determined, are obtained.

5. A system according to claim 4 in which said second inputs of said multivibrators are respectively connected to said two time bases.

6. A system according to claim 4, in which said second inputs of said first multivibrator and of said second multivibator are respectively connected with the outputs of the detector differentiator at the said chain comprising said bottom clipper, said video amplifier and said low frequency filter, whereby voltages, proportional to the angular distance between an object emitting a continuous wave and another object reflecting pulse-modulated waves, are obtained.

References Cited in the file of this patent

UNITED STATES PATENTS

| | | |
|---|---|---|
| 2,213,874 | Wagstaffe | Sept. 3, 1940 |
| 2,405,203 | Goldstein | Aug. 6, 1946 |